(12) United States Patent
Farmer et al.

(10) Patent No.: US 9,963,578 B2
(45) Date of Patent: May 8, 2018

(54) BLACK POLYIMIDES AND SYNTHESIS THEREOF

(71) Applicant: NeXolve Corporation, Huntsville, AL (US)

(72) Inventors: Brandon S. Farmer, Knoxville, TN (US); Garrett D. Poe, Madison, AL (US); David L. Rodman, Meridianville, AL (US); Lonnie F. Bradburn, Jr., Athens, AL (US)

(73) Assignee: NeXolve Corporation, Huntsville, AL (US)

( * ) Notice: Subject to any disclaimer, the term of this patent is extended or adjusted under 35 U.S.C. 154(b) by 0 days. days.

(21) Appl. No.: 13/944,135

(22) Filed: Jul. 17, 2013

(65) Prior Publication Data

US 2015/0025192 A1    Jan. 22, 2015

(51) Int. Cl.
   *C08G 73/10* (2006.01)
   *C08K 5/56* (2006.01)

(52) U.S. Cl.
   CPC ............ *C08K 5/56* (2013.01); *C08G 73/1071* (2013.01)

(58) Field of Classification Search
   None
   See application file for complete search history.

(56) References Cited

U.S. PATENT DOCUMENTS

| | | |
|---|---|---|
| 4,822,718 A | 4/1989 | Latham et al. |
| 4,876,165 A | 10/1989 | Brewer et al. |
| 5,164,460 A | 11/1992 | Yano et al. |
| 5,176,971 A | 1/1993 | Shimamura et al. |
| 5,304,626 A | 4/1994 | Burgess et al. |
| 5,780,201 A | 7/1998 | Sabnis et al. |
| 5,998,090 A * | 12/1999 | Sabnis et al. .............. 430/270.1 |
| 2003/0113640 A1 | 6/2003 | Sabnis et al. |
| 2011/0039085 A1 | 2/2011 | Carney et al. |
| 2011/0177321 A1* | 7/2011 | Carney et al. ................ 428/323 |

FOREIGN PATENT DOCUMENTS

| | | |
|---|---|---|
| EP | 0 466 061 A2 * | 1/1992 |
| EP | 2218755 A1 | 8/2010 |
| JP | 2004-115787 * | 4/2004 |
| WO | 2012177531 A1 | 12/2012 |

OTHER PUBLICATIONS

Machine translation of Ishibashi et al. JP 2004-115787, p. 1-23.*
Full translation of Uhara et al. JP 2004-115787 p. 1-47.*
PVP (Polyvinylpyrrolidone); retrieved from http://online1.ispcorp.com/brochures/performance%20chemicals/pvp.pdf; retrieved on Sep. 27, 2012.
Chemtura Corporation; Lowinox 44B25 Phenolic Antioxidant; Aug. 18, 2009.
Clariant; Safety Data Sheet in accordance with Rgulation (EU) No. 453/2010 Savinyl Black RLSN; Sep. 19, 2011.
International Search Report and Written Opinion for International application No. PCT/US2014/046787.

* cited by examiner

*Primary Examiner* — Robert T Butcher
(74) *Attorney, Agent, or Firm* — Jeremy A. Smith; Bradley Arant Boult Cummings LLP (57) ABSTRACT

Black polyimides polymer and a method of synthesizing the same have been developed. The black polyimide polymer includes at least one acid monomer, at least one diamino monomer and a solvent-soluble black dye. The acid and diamino monomers having been reacting in a solvent under suitable conditions to form a polyimide precursor polymer.

13 Claims, 2 Drawing Sheets

BLACK POLYIMIDES AND SYNTHESIS THEREOF

FIELD OF THE DISCLOSURE

The present disclosure relates to a polyimide polymer that includes a soluble black dye therein.

BACKGROUND

Polyimides are an important class of polymeric materials and are known for many desirable performance properties. These properties include high glass transition temperatures, good mechanical strength, high Young's modulus, good UV durability, and excellent thermal stability. As a result of their favorable properties, polyimide compositions have become widely used in many industries, including the aerospace industry, the electronics industry and the telecommunications industry.

In the electronics industry, polyimide compositions are used in applications such as forming protective and stress buffer coatings for semiconductors, thermal insulating coatings, dielectric layers for multilayer integrated circuits and multi-chip modules, high temperature solder masks, bonding layers for multilayer circuits, final passivating coatings on electronic devices, and many others. In addition, polyimide compositions may form dielectric films in electrical and electronic devices such as motors, capacitors, semiconductors, printed circuit boards and other packaging structures. Polyimide compositions may also serve as an interlayer dielectric in both semiconductors and thin film multichip modules. The low dielectric constant, low stress, high modulus, and inherent ductility of polyimide compositions make them well suited for these multiple layer applications. Other uses for polyimide compositions include alignment and/or dielectric layers for displays, and as a structural layer in micromachining applications. Electronic components using polyimide films are used in many other industries.

Polyimides also have many different uses in the aerospace industry, the automotive industry, the rail industry, the natural gas industry, and others. Polyimides can be used as high temperature adhesives, thermal insulations, protective coatings or layers, membranes, gaskets, and a wide variety of other uses.

The increased complexity of the applications for polyimides has created a demand to tailor the properties of such polyimides for specific applications. Compounds, pigments, substances, or other moieties incorporated into a polyimide or other polymer can change the properties of that polymer. Many different compounds can be added to polymers to change the polymer properties, and these compounds can be added in different ways. The added compounds can be covalently bonded to the polymer, dissolved or suspended in the polymer, or otherwise included in the polymer (such as with ionic bonding.) Often, an added compound will change more than one property, so controlling one property independently from a second property can be challenging. Some polymer uses require specific ranges for several different properties, and controlling the measured value of one property can co p e with controlling the value of a different property.

Pigment additives, such as carbon black, titanium dioxide, boron nitride, boron oxide covered by aluminum nitride, aluminum oxide, silicon oxide, aluminium powder, silicon dioxide, silicon carbide, aluminium nitride, calcium phosophide, barium titanium oxides, other metal oxides and metal nitrides are commonly incorporated into polyimide films to increase film opacity and so-called "hiding" effect, where it is important in the end-use application to obscure underlying components, structures, or electronic circuitry. However, even though the use of insoluble additives are effective at rendering films translucent or opaque in appearance and providing films with the desired optical properties, the inclusion of such additives may adversely affect other critical properties. For example, the dielectric breakdown voltage of the film is substantially decreased with the inclusion of metal oxide and carbon black particles. The electrical conductivity, dielectric constant, and radiofrequency (RF) absorption are both substantially increased with the use of carbon black additives, neither of which is desired for electronics applications. Additionally, the inclusion of metal oxides requires additional processing steps and manufacturing equipment which are costly to install and expensive to operate. There remains a need for an insulative black opaque black polyimide film with good dielectric properties that is easily manufacturable.

In contrast, the polyimide polymer containing the dye(s) describe herein have numerous advantages over the polyimide polymers made using carbon-black, including easier methods of synthesis as the soluble black dye is easier to incorporate in the polymer than carbon-black, reduced conductivity, reduced radio wave absorption, improved breakdown voltage and a lower than typical dielectric contant.

BRIEF DESCRIPTION OF THE DRAWINGS

To further describe advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

SUMMARY

In some aspects, the invention relates to a black polyimide polymer comprising: at least one acid monomer and at least one diamino monomer, said acid and diamino monomers having been reacting in a solvent under suitable conditions to form a polyimide precursor polymer; and a solvent-soluble black dye.

Other aspects and advantages of the invention will be apparent from the following description and the appended claims.

DETAILED DESCRIPTION

While the invention has been described with respect to a limited number of embodiments, those skilled in the art, having benefit of this disclosure, will appreciate that other embodiments can be devised which do not depart from the scope of the invention as disclosed here.

Polymers

Step-growth polymers are an important group of polymeric chemicals that have many uses and beneficial properties. Step-growth polymers are formed via step-growth polymerization in which bi-functional or multifunctional monomers react to form first dimers, then trimers, then longer oligomers and eventually long chain polymers. Generally, step-growth polymers have robust mechanical properties including toughness and high temperature resistance that make them desirable over other polymer types. There are numerous varieties of step-growth polymers, including polyimides, polyurethanes, polyureas, polyamides, phenolic resins, and polyesters.

Polyimides

Polyimides are a type of polymer with many desirable properties. In general, polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, Which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a timethylsilyl ester, all of which can react with a diamine to produce a polyimide polymer. Dianhydr d s are sometimes referred to in this description, but it is to be understood that tetraesters, diester acids, tetracarboxylic acids, or trimethylsilyl esters could be substituted, as appropriate. There are also other types of monomers that can be used in place of the di-acid monomer, as known to those skilled in the art.

Figure 1:
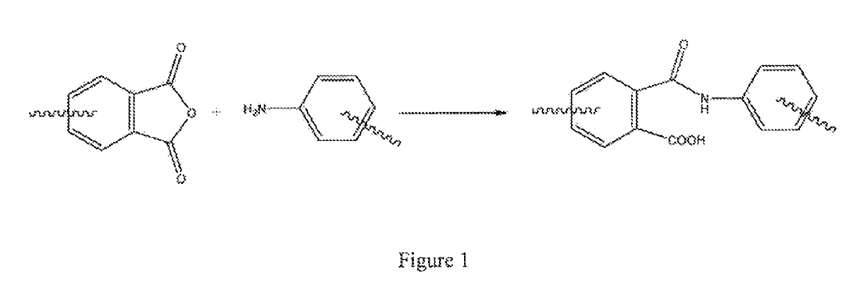
FIG. 1 depicts an example of the formation of an auric acid from an anhydride and an amine.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a poly(amic acid). The reaction of an anhydride with an amine to form an amic acid is depicted in FIG. 1.

The polyimide polymer is usually formed from two different types of monomers, and it is possible to mix different varieties of each type of monomer. Therefore, one, two, or more di-acid monomers can be included in the reaction vessel, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties.

For example, a single diamine monomer AA can be reacted with two di-acid co-monomers, $B_1B_1$ and $B_2B_2$, to form a polymer chain of the general form of $(AA-B_1B_1)_x$-$(AA-B_2B_2)$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1\text{-}BB)_x$-$(A_2A_2\text{-}BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1\text{-}B_1B_1)_w$-$(A_1A_1\text{-}B_2B_2)_x$-$(A_2A_2\text{-}B_1B_1)_y$-$(A_2A_2\text{-}B_2B_2)_z$, where w, x, y, and z are determined by the relative incorporation of $A_1A_1$-$B_1B_1$, $A_1A_1$-$B_2B_2$, $A2A_2$-$B_1B_1$, and $A_2A_2$-$B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

Polyimides may be synthesized by several methods. In the traditional two-stage method of synthesizing aromatic polyimides, a solution of the aromatic diamine in a polar aprotic solvent, such as 1-methyl-2-pyrrolidinone (NMP), is prepared. A di-acid monomer, usually in the form of a dianhydride, is added to this solution, but the order of addition of the monomers can be varied. For example, the di-acid monomer can be added first, or the di-acid monomer and the diamine can be simultaneously added. The resulting polycondensation reaction forms a poly(amic acid), also referred to as a polyamide acid, which is a polyimide precursor. Other polyimide precursors are known, including poly(amic ester)s, poly(amic acid) salts, polyisoimides and poly(amic silylester)s. This process description may be applicable to one or more polyimide precursor solutions.

There are many examples of monomers that can be used to make polyimide polymers. A non-limiting list of possible diamine monomers comprises 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl] sulfones, 2,2-bis[4-(3-aminophenoxy)phenyl]sulfones, bis (4-[4-aminophenoxy]phenyl)ether, 2,2-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diatninodiphenyl diethyl silane, benzidine, 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-atninophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy)

benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methyleyelohexylamine), 1,2-diaminoethane, 1,3-diamitiopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine.

A non-limiting list of possible diacid monomers comprises hydroquinone dianhydride, 3,3',4,4'-biplienyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfone tetracarboxylic dianhydride, 4,4'-(4,4'-isopropylidenediphenoxy)bis(phthalic anhydride), 2,2-bis(3,4-dicarboxyphenyl) propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylic dianhydride, 4,4'-oxydiphthalic dianhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyphexafluoropropane, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-,8,9,10-tetracarboxylic dianhydride, pyrazine-2,3,5,6-tetracarboxylic dianhydride, benzene-1,2,3,4-tetracarboxylic dianhydride, and thiophene-2,3,4,5-tetracarboxylic dianhydride.

Figure 2:
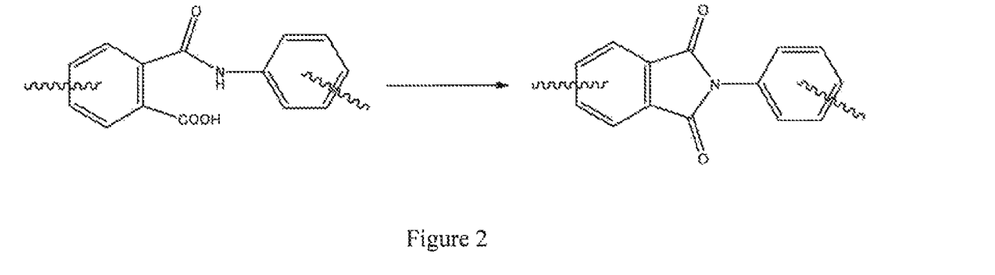
FIG. 2 depicts an example of the formation of an imide bond from an amic acid.

A poly(amic acid) is soluble in the reaction solvent and, thus, the solution may be cast into a film on a suitable substrate such as by spin casting, gravure coating, three roll coating, knife over roll coating, slot die extrusion, dip coating, or other techniques. The cast film can then be heated in stages to elevated temperatures to remove solvent and convert the auric acid functional groups in the poly(amic acid) to imides with a cyclodehydration reaction, also called imidization. "Imidization" is defined as the conversion of a polyimide precursor into an imide, Alternatively, some poly (amic acid)s may be converted in solution to polyimides by using a chemical dehydrating agent, catalyst, and/or heat. The conversion of an auric acid to an imide is shown in FIG. 2, with continuing reference to FIG. 1.

Many polyimide polymers are produced by preparing a poly(amic acid) polymer in the reaction vessel. The poly (amic acid) is then formed into a sheet or a film and subsequently processed with heat (often temperatures higher than 250 degrees Celsius) or both heat and catalysts to convert the poly(amic acid) to a polyimide. However, poly (amic acid)s are moisture sensitive, and care must be taken to avoid the uptake of water into the polymer solution. Additionally, poly(amic acid)s exhibit self-imidization in solution as they gradually convert to the polyimide structure. The imidization reaction generally reduces the polymer solubility and produces water as a by-product. The water produced can then react with the remaining poly(amic acid), thereby cleaving the polymer chain. Moreover, the poly (amic acid)s can generally not be isolated as a stable pure polymer powder. As a result, poly(amic acid)s tend to have a limited shelf life. Shelf life can be extended by storing a poly(amic acid) at reduced temperatures. For example, shelf life can be increased by storing a poly(amic acid) at temperatures less than −20 degrees Celsius.

The characteristics or properties of the final polymer are significantly impacted by the choice of monomers which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used. For example, itis important for a polymeric protective cover of a windshield to be clear, but it may be less important for the polymer to be resistant to attack from monoatomic oxygen. Other factors to be considered in the selection of monomers include the expense and availability of the monomers chosen. Commercially available monomers that are produced in large quantities generally decrease the cost of producing the polyimide polymer film since such monomers are in general less expensive than monomers produced on a lab scale and pilot scale. Additionally, the use of commercially available monomers improves the overall reaction efficiency because additional reactions are not required to produce a monomer which is incorporated into the polymer.

Most polyimides are comprised of relatively rigid molecular structures such as aromatic/cyclic moieties. These typical structures are often relatively linear and stiff. The linearity and stiffness of the cyclic/aromatic backbone reduces segmental rotation and allows for molecular ordering which results in lower CTE than many thermoplastic polymers having more flexible chains. In addition, the intermolecular associations of polyimide chains provide resistance to most solvents, which tends to reduce the solubility of many typical polyimide polymers in many solvents. The use of aliphatic monomers can reduce the stiffness of the polymer, if desired.

Polyimide polymers have a backbone, where the polymer backbone includes the string of atoms that form a chain from one end of the polymer to the other. Some compounds or sub-compounds which are not part of the polymer backbone can still be linked to the polymer. A tether refers to a molecular chain that is used to connect the polymer backbone to another compound, moiety, or sub-compound. A compound can be connected directly to the polymer backbone, or the compound can be connected using a tether.

Some compounds can be incorporated into a polyimide without being covalently connected to the polymer. For example, a compound can be dissolved or suspended in the polyamic reaction mass, and can then become entrapped in the polyimide during and after imidization. Often, compounds which are dissolved or suspended will tend to aggregate, so the final polyimide has areas where the compound is phase-separated into domains of higher concentrations of the compound, and other domains where the compound is less concentrated. Polyimide films that are otherwise transparent or translucent can include phase domains of a high enough concentration of a compound with sufficiently large diameters to exhibit light scattering manifesting in a hazy appearance. One way to determine if a compound includes aggregated inclusions is to examine the level of haze in the film as compared to the polyimide film without any compound. The presence of a haze tends to indicate macroscopic aggregated domains Phase separation of a compound into domains of higher concentration with diameters sufficiently large to produce a haze is considered a macroscopic effect in this description, and therefore indicates the compound is not considered to be evenly distributed. The exact size of aggregated domains can vary somewhat for different compounds.

Specific properties of a polyimide can be influenced by incorporating certain compounds into the polyimide. The selection of monomers is one way to influence specific properties. Another way to influence properties is to add a compound or property modifying moiety to the polyimide. It can be difficult to covalently bond a compound along the length of a polymeric chain, and the total quantity of material added at the end of a polymeric chain is limited. The quantity of a compound that can be added to a polymer by dissolution or suspension can also be limited, because many compounds have limited solubility, and compounds in suspension tend to agglomerate into an uneven distribution in the polymer. An evenly dispersed compound or property modifying moiety is generally preferred to an unevenly dispersed compound or property modifying moiety because the polymer properties are more consistent with even dispersion. In this description, the term "evenly dispersed" is defined as one compound or moiety is evenly dispersed in a polymer, solution, or reaction mass on a macroscopic level. The haze value of a transmissive sample is the ratio of the intensity of scattered light to the intensity of total transmitted light. An evenly dispersed compound generally results in a haze value of less than 5%, and an unevenly dispersed compound generally results in a haze value of 5% or more. In this description, a compound is considered evenly dispersed in a polymer, solution, or reaction mass if a light path length of 8 to 12 microns produces a haze value of less than 5%. It is understood that there may be clusters on a microscopic level, even if a compound is evenly dispersed on a macroscopic level.

Polyurethanes

Polyurethanes are polymer composed of a chain of monomeric units joined by urethane links. Polyurethanes are extremely versatile owing to their relatively wide monomer availabilities, relatively low cost, and ease of processing. Polyurethane polymers are often formed by reacting an isocyanate with a polyol. For example, polyurethanes can be produced by reacting an isocyanate containing two or more isocyanates groups per molecule (R—(N=C=O)$_{n\geq2}$) with a polyol containing on average two or more hydroxy groups per molecule (R'—(OH)$_{n\geq2}$), in the presence of a chemical catalyst, heat, or both, as shown below:

Isocyanates are often classified as either aromatic or aliphatic, depending on their structure. Toluene diisocyanate (TDI) methylene diphenyl diisocyanate, (MDI), 4,4'-diisocyanato dicyclohexylmethane (hydrogenated MDI), isophorone diisocynate (IDPI), isocyanurate trimer of HDI (HDI trmer), naphthalene diisocynate (NDI), and hexamethylene diisocynate (HMDI) are all isocyanates in relatively widespread commercial use. Isocyanates may be modified by partially reacting them with polyols or introducing some other materials to reduce volatility (and hence toxicity) of the isocyanates, decrease their freezing points to make handling easier or to improve the properties of the final polymers.

Polyols are most commonly polyether polyols, which are made by the reaction of epoxides with an active hydrogen containing starter compounds, or polyester polyols, which are made by the polycondensation of multifunctional carboxylic acids and hydroxyl compounds. They can be further classified according to their end use. Higher molecular weight polyols (molecular weights from 2,000 to 10,000) are used to make more flexible polyurethanes while lower molecular weight polyols make more rigid products. Some common polyols are polyethylene adipate, polypropylene glycol, poly(tetramethylene ether) glycol, polyethylene glycol, other polyester polyols, polycarbonate polyol, other polyether polyols, polycaprolactone polyol, and polybutadiene polyol.

Polyurethane products are provided in many shapes and forms for a variety of applications, including foams for insulation, sound dampening, seals, gaskets, and carpet underlay, durable elastomeric goods for wheels, tires, and automotive suspension bushings, conformal encapsulants as electrical potting compounds, and hard and soft plastic parts for a variety of other uses in industry.

Polyureas

Polyureas are polymer composed of a chain of monomeric units joined by urea linkages. Polyureas polymers are formed by reacting an isocyanate with a polyamine, as shown below:

Many of the same type of precursors are used to form polyureas as are used to form polyurethanes, insofar as polyamines are substituted for polyols to react with the isocyanate, Some common polyamines used in the synthesis of polyureas include polyaspartic polyester, polyethylene adipate, polypropylene glycol, poly(tetramethylene ether) glycol, polyethylene glycol, polyester, polypropylene glycol, polycarbonate polyol, polyethers, polytetramethylene glycol, polycaprolactone polyol and polybutadiene polyol.

Polyureas are useful for coatings used in extreme environments in addition many of the same uses as polyurethanes.

Polyesters

Polyesters are defined as polymers containing at least one ester linking group per repeating unit of the polymer. Polyesters are a versatile class of polymers with many industrial uses including clothing, other fabrics, structural resins (such as bottles and piping) and even in some biodegradable applications. Polyesters may be synthesized in a number of ways, one example being a polyesterification reaction between dibasic acids and diols (or derivatives thereof). Another synthesis method involves the polymerization of a monomer that includes the acid and alcohol on the same monomer. A third synthesis method involves the ring opening polymerization of lactone monomers. The polyester synthesis between a diacid and a diol is shown below:

Polyester products are provided in many shapes and forms for a variety of applications, including fibers, yarns, cords, and ropes for the woven, knit, and nonwoven consumer and industrial textiles products industry, and bottles, films, thermoform sheets, and slit straps for the packaging industry. Specific polyesters with widespread commercial adoption include polyethylene terephthalate (PET), polybutylene terephthalate (PBT), polytrimethylene terephthalate (PTT), polyethylene naphthalate (PEN). In one aspect, the present disclosure provides an aerogel comprising polyglycolic acid (PGA), polylactic acid (PLA), polycaprolactone (PCL), polyethylene adipate (PEA), polyhydroxyalkanoate (PHA), polyhydroxybutyrate (PHB), poly(3-hydroxybutyrate-co-3-hydroxyvalerate) (NEW), or poly(4-hydroxybenzoic acid-co-6-hydroxynaphthalene-2-carboxylic acid) (Vectran®) synthesized by the methods disclosed herein.

Polyamides

Polyesters are defined as polymers containing at least one amide linking group per repeating unit of the polymer. Polyamides ides are most often made from diamines and dibasic acids, lactams or β-amino acids. Some polyamides, similar to polyimides, are considered an AA-BB type polymer if two different classes of monomers are used to produce the polyamide polymer. Polyamides can also be prepared from AB type monomers. Polyamides may be produced by the interaction of an amine (—$NHR_1$) group and a carboxyl (—$COR_2$) group, or they may be formed by the polymerization of amino acids or amino-acid derivatives (whose molecules contain both amino and carboxyl groups). A representative AA-BB polyamide synthesis between a diacid and a diamine monomer is shown below:

Phenolic Resins

Phenolic resins are a family of polymers which are commonly used in adhesives, coatings, automotive components and electrical components. Generally phenolic resins are products of reacting phenols (or derivatives thereof) with formaldehyde (or derivatives thereof). Depending on the reaction conditions and the ratio of phenol to formaldehyde, two types of phenolic resins may be formed: (i) novolacs and (ii) resoles. Novolacs are formed in acidic conditions while resoles are formed in basic conditions.

Phenol is the most commonly used precursor, although cresols, p-tert-butylphenol, p-phenylphenol, cardanol and resorcinol can also be used.

An example of a novolac resin is shown below:

Synthesis of Polyimide Polymer

Synthesis of Polyimide Precursor

The first stage in the synthesis of the black polymer is the synthesis of a polymerized polyimide precursor polymer. For example, if a black polyimide polymer is desired, at least one acid monomer can be reacted with at least one diamino monomer in a reaction solvent to form a poly(amic acid). As discussed above, numerous acid monomers and diamino monomers may be used to synthesize the poly(amic acid).

In one embodiment, the diamino monomer is selected from the group consisting of 4,4'-oxydianiline (ODA), 3,4-oxydianiline (3,4-ODA), p-phenylenediamine (p-PDA), m-phenylenediamine (m-PDA), 4,4'-diaminodiphenyl sulfone (4,4-$DDSO_2$), 2,2'-bis-(4-aminophenyl)-hexafluoropropane (4-BDAF), benzidene, o-tolidine, or m-tolidine and the diamino monomer may be dissolved in an amide solvent such as N,N-dimethylacetamide (DMAc), 1-methyl-2-pyrrolidinone (NMP), or N,N-dimethylformamide (DMF). Next, the acid monomer is added to the diamino monomer/solvent solution. In one embodiment, the acid monomer is selected from the group consisting of pyromellitic dianhydride (PMDA), 3,3,4,4'-biphenyl tetracarboxylic dianhydride (BPDA), 3,3',4,4'-benzophenone tetracarboxylic dianhydride (BTDA), 4,4'-(hexafluoroisopropylidene)diphthalic anhydride (6FDA), or 4,4'-oxydiphthalic anhydride (ODPA). The solution is then mixed until a viscous resin comprising a poly(amic) acid is obtained.

Then a soluble black dye is added to the resin. There are a number of black dyes that may be suitable for use in synthesizing a black polyimide polymer. Non-limiting examples include savinyl black RLSN (solvent black 45), solvent black 15, and a mixture of dyes such as solvent violet 13/disperse yellow 64. Optionally, a thermal stabilizing agent can also be added to the resin. The thermal stabilizing agent serves to stabilize the polyimide polymer and the colorant during the thermal curing process (see below) and against high temperatures after synthesis. Some non-limiting examples of acceptable thermal stabilizing agents suitable for this process include the anti-oxidants Lowinox 44B25 and butylated hydroxytoluene (BHT).

Optionally, an additive to increase light scattering or light absorption can be added to the resin. Some non-limiting examples of acceptable light scattering or light absorbing agents suitable for this process include titanium dioxide, aluminum oxide, silicon oxide, silicone dioxide, zinc oxide, boron oxide, barium titanium oxides, calcium phosophide, other metal oxides, boron nitride, boron oxide covered by aluminum nitride, aluminum nitride, other metal nitrides, silicon carbide, other metal carbides, or carbon Hack.

The resin then may be contacted with an imidization catalyst in the presence of a chemical dehydrating agent to form a polymerized polyimide gel via an imidizaton reaction.

Any imidization catalyst suitable for driving the conversion of polyimide precursor to the polyimide state is suitable for use in the methods of the present invention. Preferred chemical imidization catalysts comprise at least one compound selected from the group consisting of pyridine, methylpyridines, quinoline, isoquinoline, triethylenediamine, lutidine, N-methylmorpholine, triethylamine, tripropylamine, tributylamine, and other trialkylamines. Any dehydrating agent suitable for use in formation of an imide ring from an amic acid precursor is suitable for use in the methods of the present invention. Preferred dehydrating agents comprise at least one compound selected from the group consisting of acetic anhydride, propionic anhydride, n-butyric anhydride, benzoic anhydride, trifluoroacetic anhydride, phosphous trichloride, and dicyclohexylcarbodiimide.

Then, the resin is then mixed until a homogeneous viscous resin mixture is obtained. The resin may optionally be cast onto a casting sheet for a period of time. In one embodiment, the casting sheet is a plastic, metal, or glass casting sheet. After a passage of time, the resin may increase in viscosity to a gel state, and the gel is optionally removed from the casting sheet and thermally cured as described below. Optionally, the resin or gel may be thermally cured directly on the casting sheet as described below.

Thermal Curing

After casting, the polyimide precursor is thermally cured (or heated) for a period of time to convert the cast polyimide precursor into a creasable black film. The curing time is dependent upon the type of polyimide precursor being cured and the curing temperature. For example, if a polyimide polymer is desired, the curing may be done at about 250-350 degrees Celsius for about one to five minutes.

Properties of Black Polyimide Polymer

The black polyimide polymers described herein exhibit a number of desirable chararestics over those polyimide polymers that include pigment additives. For example, the dielectric breakdown voltage of the black polyimide polymers herein is significantly greater than is known in the art. Dielectric breakdown refers to the formation of electrically conducting regions in an insulating material exposed to a strong electric field.

As set forth in Table 1, the dielectric breakdown values for the black polyimide polymers described herein ranged from about 200 V/μm to 220 V/μm compared to dielectric breakdown values below 3 V/μm to 35 V/μm for polymers containing pigment additives. The dielectric breakdown measurements made herein were determined by American Society for Testing and Material (ASTM) test method D149-09 (2013) Method A. The surface resistivity values for the black polyimide polymers described herein exceed $10^{13} \Omega/\square$ for all specimens, compared to surface resistivities ranging from greater than $10^{13} \Omega/\square$ to approximately $10^4 \Omega/\square$ for the polymers containing pigment additives,

EXAMPLES

The process described above can be used to introduce a wide variety of polyimide polymers. Detailed below are several non-limiting examples of specific methods and polyimide polymers synthesized pursuant to the present disclosure.

1. Black Polyimide Film with 5% Darkening Additive, Thermally Cured.

To a sealed reactor vessel was added 35.90 g of ODA and 275.00 g of DMAc. The vessel was purged with dry nitrogen for 2 minutes prior to sealing the vessel. The contents were mixed until the ODA completely dissolved. The reactor vessel was then opened and 39.10 g of PMDA was added to the solution. The system was purged with dry nitrogen for 10 seconds and then resealed. The resultant slurry was vigorously mixed until a viscous resin solution was obtained. To the reactor vessel containing the viscous resin solution was added 40.00 grams of DMAc, and 3.75 grams of Savinyl Black RLSN dye. The resin was vigorously mixed until a homogeneous viscous resin mixture was obtained. The resulting resin mixture was then filtered through an 11 micron pore size nylon membrane filter and cast onto a glass substrate. The wet film as converted into a dried polyimide film by heating to 300 degrees Celsius. The resulting black film was 20 microns in thickness, creasable, with a dielectric strength of 212 Volts/micron.

2. Black Polyimide Film with 10% Darkening Additive, Thermally Cured.

To the PMDA/ODA polymerized resin prepared as described in Example 1 was added 40.00 grams of DMAc and 7.50 grams of Savinyl Black RLSN dye. The remainder of the processing steps remained the same as outlined in Example 1. The resulting black film was 23 microns in thickness, creasable, with a dielectric strength of 201 Volts/micron.

3. Black Polyimide Film with 15% Darkening Additive, Thermally Cured.

To the PMDA/ODA polymerized resin prepared as described in Example 1 was added 40.00 grams of DMAc and 11.25 grams of Savinyl Black RLSN dye. The remainder of the processing steps remained the same as outlined in Example 1. The resulting black film was 22 microns in thickness, creasable, with a dielectric strength of 218 Volts/micron.

4. Black Polyimide Film with 5% Darkening Additive, Chemically and Thermally Cured.

A PMDA/ODA polymerized resin was prepared as described in Example 1 using DMF instead of DMAc. To the previously polymerized resin was added 1.35 grams of Savinyl Black RLSN and 0.24 grams of Lowinox 44B25 with mixing to yield a homogeneous resin mixture. To the darkened viscous polymerized resin, 9.06 grams of acetic anhydride and 1.14 grams of isoquinoline were added and vigorously mixed until the resin was homogenous. The resulting viscous resin mixture obtained was immediately cast onto a metal substrate. The wet, gelled film was dried and cured by heating to 300 degrees Celsius. The resulting black film was 20 microns in thickness and creasable.

5. Black Polyimide Film with 15% Darkening Additive, Chemically and Thermally Cured.

A PMDA/ODA polymerized resin was prepared as described in Example 1 using DMF instead of DMAc. To the previously polymerized resin was added 4.05 grams of Savinyl Black. RLSN and 0.72 grams of Lowinox 44B25 with mixing to yield a homogeneous resin mixture. To the darkened viscous polymerized resin, 9.06 grams of acetic anhydride and 1.14 grams of isoquinoline were added and vigorously mixed until the resin was homogenous. The resulting viscous resin mixture obtained was immediately cast onto a metal substrate. The wet, gelled film was dried and cured by heating to 300 degrees Celsius. The resulting black film was 20 microns in thickness and creasable.

6. Black Polyimide Film with 5% Darkening Additive and Antioxidant, Thermally Cured.

To the PMDA/ODA polymerized resin prepared as described in Example 1 was added an additional 0.75 grams of Lowinox 44B25 immediately following addition of Savinyl Black RLSN dye. All other processing parameters were the same.

7. Black Polyimide Film with 5% Darkening Additive, 1% Pigment and Antioxidant, Thermally Cured.

PMDA/ODA polymerized resin was prepared as described in Example 1 using DMF instead of DMAc. To the previously polymerized resin was added 1.85 grams of Savinyl Black RLSN, 0.37 grams of Lowinox 44B25, and 0.37 grams of titanium dioxide with mixing to yield a homogeneous resin mixture. All other processing parameters were the same. The resulting black film was 26 microns in thickness and creasable, 8. Black Polyimide with 5% Darkening Additive, Thermally Cured.

To a sealed reactor vessel was added 12.43 grams of pPDA, 33.14 grams of BPDA and 202.44 grams of DMF. The vessel was purged with dry nitrogen for 2 minutes prior to sealing the vessel. The reactor vessel was then mixed until a viscous resin solution was obtained. To the reactor vessel containing the viscous resin solution was added 2.31 grams of Savinyl Black RLSN dye. The resin was then mixed until a homogeneous viscous resin mixture was obtained. The resulting resin mixture was then filtered through an 11 micron pore size nylon membrane filter and cast onto a glass substrate. The wet film was dried by heating to 300 degrees Celsius. The resulting black film was 35 microns in thickness.

9. Black Soluble Polyimide Film with 5% Darkening Additive, Lower Temperature Cured.

Colorless Polyimide 1 (CP1) polymer powder, a soluble polyimide, was provided by NeXolve Corporation. To a plastic mixing vessel were added 300 grams of CP1 powder and 2056.64 grams of diglyme. The CP1 powder and diglyme were mixed until a homogeneous viscous resin solution was obtained.

To a sealed mixing vessel was added 251.46 grams of the previously mixed resin and 1.60 grams of Savinyl Black RLSN dye. The mixture was vigorously mixed until a homogeneous resin mixture was obtained. The resulting homogeneous mixture was then filtered through an 11 micron pore size nylon membrane filter and cast onto a glass substrate. The resultant film was then heated to 250 degrees Celsius to yield a dried film. The resulting black film was 20 microns in thickness and creasable.

10. Black Soluble Polyimide Film with 10% Darkening Additive, Lower Temperature Cured.

To 249.47 grams of CP1 and diglyme resin prepared as outlined in Example 9 and contained in a mixing vessel was added 3.17 grams of Savinyl Black RLSN dye. The remainder of the processing steps remained the same as outlined in Example 9. The resulting black film was 27 microns in thickness and creasable.

11. Black Soluble Polyimide Film with 15% Darkening Additive, Lower Temperature Cured.

To 260.07 grams of CP1 and diglyme resin prepared as outlined in Example 9 and contained in a mixing vessel was added 4.96 grams of Savinyl Black RLSN dye. The remainder of the processing steps remained the same as outlined in Example 9. The resulting black film was 30 microns in thickness and creasable.

12. Black Polyimide Film with 5% Carbon Black, Thermally Cured.

Example 12 is a control sample synthesized using carbon black. To the PMDA/ODA polymerized resin prepared as described in Example 5 was added 50 grams of a media milled carbon black and DMAc slurry at 3.2% carbon black in place of the Savinyl Black RLSN dye.

The remainder of the processing steps are the same as outlined in Example 5. The resulting black film was 22 microns in thickness, creasable, with a dielectric strength of 32 Volts/micron.

13. Black Polyimide Film with 10% Carbon Black, Thermally Cured.

Example 13 is a control sample synthesized using carbon black. To the PMDA/ODA polymerized resin prepared as described in Example 5 was added 100 grams of a media milled carbon black and DMAc slurry at 3.2% carbon black in place of the Savinyl Black RLSN dye. The remainder of the processing steps are the same as outlined in Example 5. The resulting black film was 27 microns in thickness, creasable, with a dielectric strength of 4 Volts/micron.

14. Black Polyimide Film with 15% Carbon Black, Thermally Cured.

Example 14 is a control sample synthesized using carbon-black. To the EVIDA/ODA polymerized resin prepared as described in Example 5 was added 150 grams of a media milled carbon black and 1)Ac slurry at 12% carbon black in place of the Savinyl Black RLSN dye. The remainder of the processing steps remained the same as outlined in Example 1. The resulting black film was 32 microns in thickness, and creasable. The dielectric strength of the film was less than 3 Volts/micron.

TABLE 1

| Polymer | Additive | Loading OWP | Dielectric Breakdown | Surface Resistivity ($\Omega/\square$) | Optical Density |
|---|---|---|---|---|---|
| PMDA/ODA | Carbon Black | 5% | 32 V/μm | $10^{13}$ | 4.8 |
| PMDA/ODA | Carbon Black | 10% | 4 V/μm | $10^{13}$ | 5.7 |
| PMDA/ODA | Carbon Black | 15% | N/A* | $10^4$ | 5.7 |
| PMDA/ODA | Savinyl Black RLSN | 5% | 212 V/μm | $10^{13}$ | 2.0 |
| PMDA/ODA | Savinyl Black RLSN | 10% | 201 V/μm | $10^{13}$ | 4.0 |
| PMDA/ODA | Savinyl Black RLSN | 15% | 218 V/μm | $10^{13}$ | 4.5 |

*The surface resistivity of the material was measured below the 3 V/μm sensitivity of the test instrument and was therefore not able to be determined.

The invention claimed is:

1. A black polyimide polymer composition comprising:
   a. a polyimide which in turn comprises at least one acid monomer and at least one diamino monomer, said acid and diamino monomers having been reacted under suitable conditions to form a polyimide precursor polymer;
   b. a solvent-soluble dye; and
   c. at least one of a light scattering additive or a light absorbing additive, wherein the at least one of a light scattering additive or a light absorbing additive are selected from the group consisting of: titanium dioxide, aluminum oxide, zinc oxide, boron oxide, barium titanium oxides, calcium phosphide, other metal oxides, boron nitride, boron oxide covered by aluminum nitride, aluminum nitride, non-aluminum metal nitrides, silicon carbide and non-silicon metal carbides, wherein (i) the polymer has a dielectric breakdown of greater than about 35 V/μM and (ii) said dye is incorporated into the polymer at a weight of between 10 and 15% based on the weight of the polymer.

2. The polymer of claim 1, wherein said acid monomer is selected from the group consisting of: hydroquinone dianhydride, 3,3',4,4'-biphenyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfone tetracarboxylic dianhydride, 4,4'-(4,4'-isopropylidenediphenoxy)bis(phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylic dianhydride, 4,4'-oxydiphthalic dianhydride, 3,3',4,4'-biphenylsulfone tetracarboxylic dianhydride, 3,4,9,10-perylene tetracarboxylic dianhydride, bis (3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-, 8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

3. The polymer of claim 1, wherein said diamino monomer is selected from the group consisting of: 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfone, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidene, 2,2'-dimethylbenzidine (m-tolidine), and 3,3'-dimethylbenzidine (o-tolidine), 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl) aniline, bis(p-beta-amino-t-butylphenyl)ether, p-bis-2-(2-methyl-4-aminopentyl)benzene, p-bis(1,1-dimethyl-5-aminopentyl)benzene, 1,3-bis(4-aminophenoxy)benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane and 4,4'-methylenebisbenzeneamine.

4. The polymer of claim 1, wherein said acid monomer is selected from the group consisting of: pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-(hexafluoroisopropylidene)diphthalic anhydride (6FDA) and 4,4'-oxydiphthalic anhydride (ODPA).

5. The polymer of claim 1, wherein said diamino monomer is selected from the group consisting of: 4,4'-oxydianiline (ODA), 3,4-oxydianiline (3,4-ODA), p-phenylenediamine (p-PDA), m-phenylenediamine (m-PDA), 4,4'-diaminodiphenyl sulfone (4,4'-DDSO$_2$), 3,3'-diaminodiphenylsulfone (3,3'-DDSO$_2$), 2,2'-bis-(4-aminophenyl)-hexafluoropropane (4-BDAF), benzidene, 2,2'-dimethylbenzidine (m-tolidine), and 3,3'-dimethylbenzidine (o-tolidine).

6. The polymer of claim 1 further comprising a thermal stabilizing agent.

7. The polymer of claim 6 wherein the thermal stabilizing agent is an anti-oxidant.

8. The polymer of claim 7 having a dielectric breakdown of between about 200 V/μM and 220 V/μM.

9. The polymer of claim 7 having a dielectric breakdown of between about 210 V/μM and 220 V/μM.

10. The polymer of claim 1 having a surface resistivity of greater than $1 \times 10^{13}$ Ω/sq.

11. The polymer of claim 4, wherein said diamino monomer is selected from the group consisting of: 4,4'-oxydianiline (ODA), 3,4-oxydianiline (3,4-ODA), p-phenylenediamine (p-PDA), m-phenylenediamine (m-PDA), 4,4'-diaminodiphenyl sulfone (4,4'-DDSO$_2$), 3,3'-diaminodiphenylsulfone (3,3'-DDSO$_2$), 2,2'-bis-(4-aminophenyl)-hexafluoropropane (4-BDAF), benzidene, 2,2'-dimethylbenzidine (m-tolidine), and 3,3'-dimethylbenzidine (o-tolidine).

12. The polymer of claim 11 having a dielectric breakdown of between about 200 V/μM and 220 V/μM.

13. The polymer of claim 12 having a surface resistivity of greater than $1 \times 10^{13}$ Ω/sq.

\* \* \* \* \*